Figure 1:
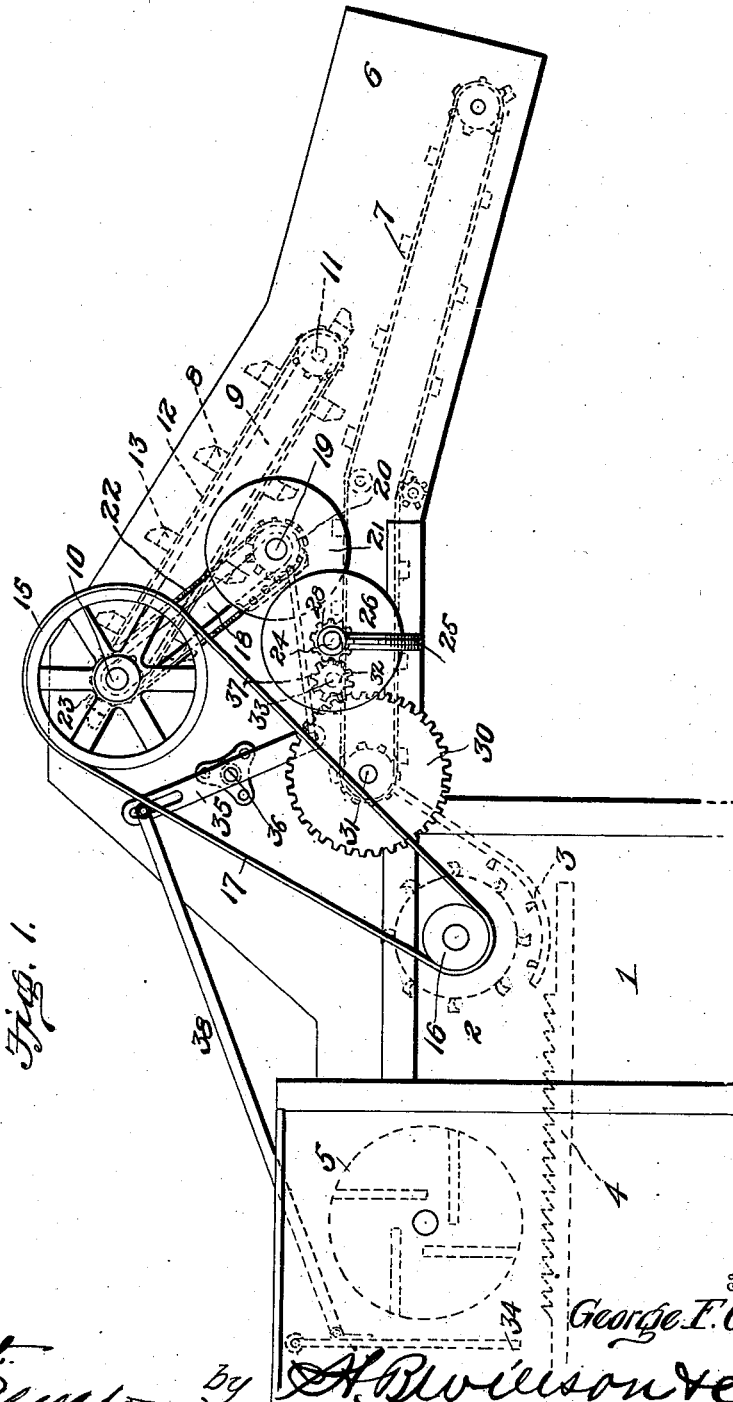

No. 661,039. Patented Nov. 6, 1900.
G. F. CONNER.
THRESHING MACHINE.
(Application filed July 26, 1900.)

(No Model.) 3 Sheets—Sheet 2.

Witnesses
Inventor
George F. Conner
by Attorneys

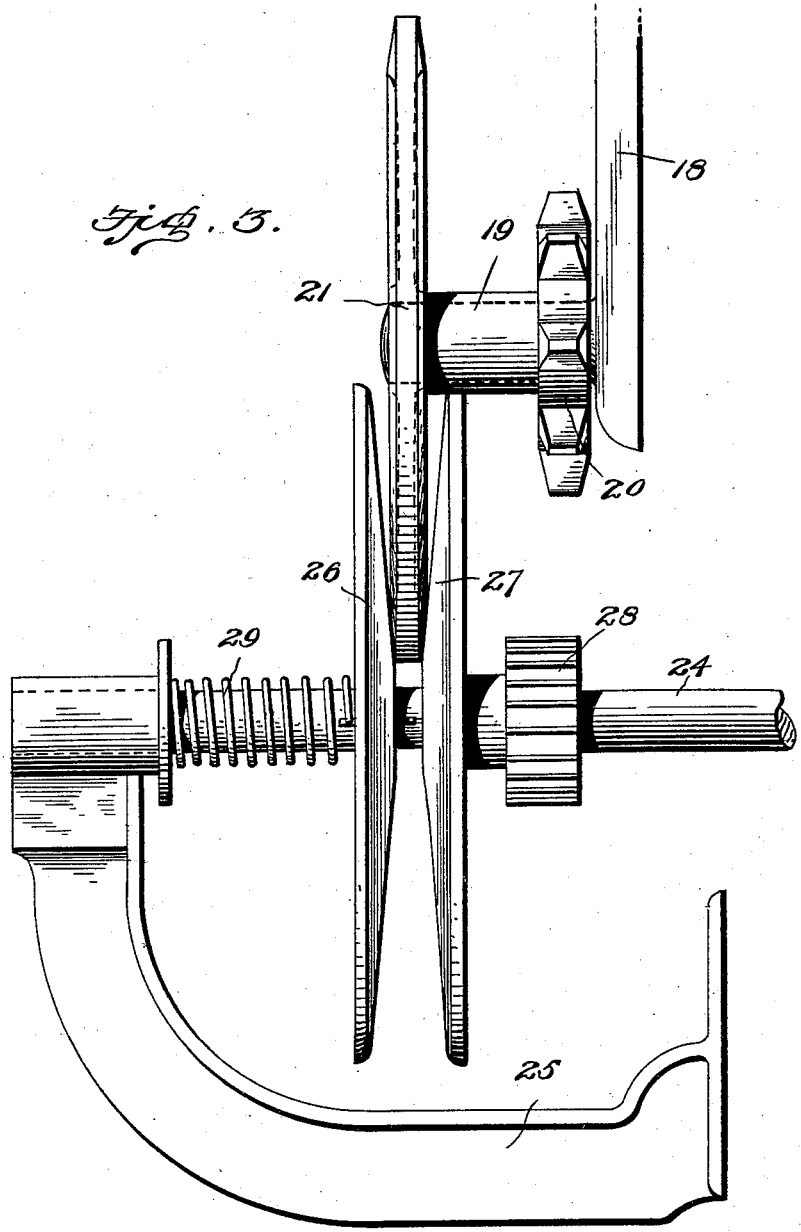

UNITED STATES PATENT OFFICE.

GEORGE F. CONNER, OF PORT HURON, MICHIGAN.

THRESHING-MACHINE.

SPECIFICATION forming part of Letters Patent No. 661,039, dated November 6, 1900.

Application filed July 26, 1900. Serial No. 24,898. (No model.)

*To all whom it may concern:*

Be it known that I, GEORGE F. CONNER, a citizen of the United States, residing at Port Huron, in the county of St. Clair and State of Michigan, have invented certain new and useful Improvements in Threshing-Machines; and I do declare the following to be a full, clear, and exact description of the invention, such as will enable others skilled in the art to which it appertains to make and use the same.

The invention relates to threshing-machines, and more particularly to means for regulating, controlling, or stopping the feed of the bundles to the threshing-cylinder.

In order to appreciate the present invention and to understand its operation and to draw a line of demarcation between it and the state of the art relating to this class of inventions, it may be well at the beginning to state briefly the means now generally employed for automatically regulating the feed of grain to the threshing-cylinder.

The greater number of machines for automatically controlling the quantity of straw fed to the thresher are provided with means actuated by the column of straw, or rather the size or bulk of the bundle. The objection to machines of this class has been made that the feeder itself has not been competent to properly regulate the amount of straw in the machine at the rear of the threshing-cylinder, as the straw at this point may vary greatly from that being fed to the cylinder. If hard compact straight bundles are being fed and the feeder has been adjusted properly to supply the separator with that style of bundles and a large loose bundle or mass of straw is thrown suddenly into the feeder, the automatic means have been unable to recognize or distinguish the difference between the hard compact bundles or mass and the loose bundles or mass. Consequently the regulator, being actuated by the bulk instead of the quantity, immediately cuts off the feed incommensurate with the capacity of the threshing-machine, or if set to feed a proper amount of loose grain it will feed too much of hard or compact grain.

The objects of the present invention are to provide means for regulating, controlling, or stopping automatically the feed of the material to the cylinder by the threshed material at the rear of the cylinder; furthermore, to provide means whereby the controlling or regulating means may be adjusted to vary the feed of the material to the machine, and, finally, to provide means for these purposes which shall be simple of construction, durable in use, and comparatively inexpensive of production.

With these and other objects in view the invention consists in certain features of construction and combination and arrangement of parts which will be hereinafter fully set forth.

Figure 2:
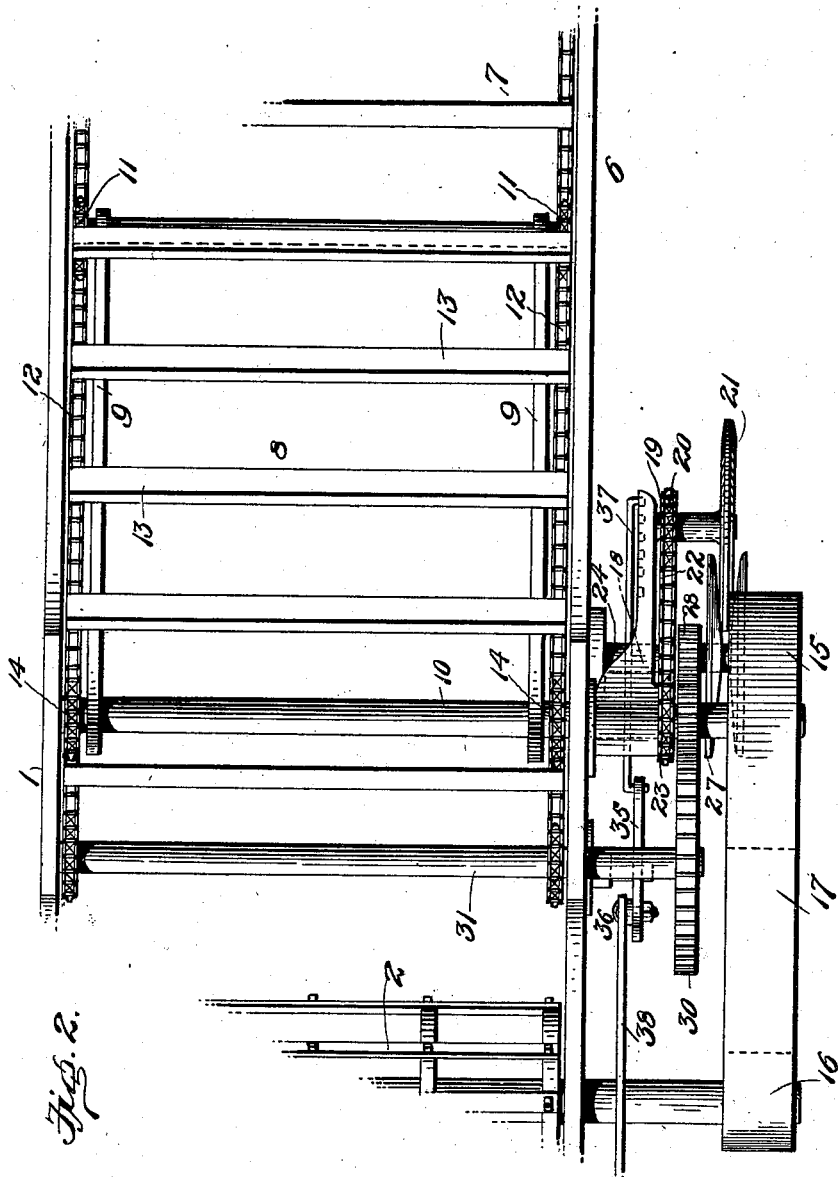

In the accompanying drawings, in which I have illustrated the application of my invention, Figure 1 is a side elevation of a band-cutter and feeder and the front end of a threshing-machine, the bundle-conveyer, the band-cutter, the cylinder, its concave, the straw carrier or shaker, its coacting beater, and the regulating device being shown in dotted lines. Fig. 2 is a top plan view, and Fig. 3 is an enlarged detail view, of the variable-friction gearing.

In the drawings, 1 denotes the front end of a threshing-machine or separator. 2 denotes the threshing-cylinder, and 3 its concave. 4 denotes the straw carrier or shaker, arranged below and at the rear of the concave, and 5 denotes the beater, located above the carrier or shaker 4. These parts may be of any well-known or approved construction and in themselves form no part of the present invention.

6 denotes the self-feeder, connected to the front end of the threshing-machine and comprising in its construction an endless bundle-conveyer 7. The feeder may be of any well-known or approved construction.

8 denotes a band-cutter mounted above the endless conveyer 7 and designed to sever the bands as the bundles are fed to the machine by said conveyer. This band-cutter may be of any well-known or approved construction. In the present instance I have shown it as consisting of side pieces 9, the rear ends of which are loosely journaled upon a shaft 10, while the lower ends are provided with sprocket-wheels 11 to receive the endless chains 12, which carry the cutting devices 13. The shaft 10 is provided with sprocket-wheels 14, with which the chains 12 are engaged and by which they are operated to actuate the cutting devices 13. By thus mounting the band-cutter its lower end is permitted to swing or fold up and down as the bundles are fed by the conveyer 7 to the threshing-machine and will thus accommodate itself to bundles or masses of grain of different thicknesses.

The shaft 10 has fixed to it a band-wheel 15, which is connected to a similar wheel 16 by a drive-belt 17. The wheel 16 is fixed to the shaft of the threshing-cylinder, which is driven from any suitable source of power. 18 denotes an arm the upper end of which is journaled to the shaft 10 and the lower end of which is provided with a stud-bearing 19, upon which is journaled a sprocket-wheel 20, which is fixed to a friction gear or disk 21, that constitutes one member or element of the variable-friction gear, which will be hereinafter described.

The sprocket-wheel 20 is connected by a chain 22 to a sprocket-wheel 23, fixed to the shaft 10, and thus it is constantly driven and drives the friction disk or gear 21.

24 denotes a stud-shaft projecting laterally from the side piece of the bundle-feeder and has its outer end supported by a bearing-bracket 25.

26 and 27 denote two friction-disks constituting the other elements or members of the variable-friction gearing. One of these disks—the disk 27—is fixed to the shaft 24 to rotate therewith and without longitudinal movement thereon and is provided with a gear-wheel 28. The other disk, 26, is splined upon said shaft to rotate therewith and to move longitudinally thereof, and under the action of a spring 29 this disk 26 and its companion disk 27 are held in frictional engagement with the friction-disk 21, so that the movement of said latter disk is transmitted to the disks 26 and 27 to rotate the shaft 24.

30 denotes a gear-wheel fixed to a shaft 31, arranged at the rear end of the feeder, and this shaft 31 is provided with the usual sprocket-wheels, which drive the endless chain of the conveyer 7 in the usual manner. Interposed between the gears 28 and 30 and in mesh therewith is an idle gear 32, journaled upon a stud-shaft 33, projecting laterally from the side piece of the feeder.

34 denotes a regulating device which may consist of a board mounted at some point within the threshing-machine at the rear of the threshing-cylinder and within the path of movement of the straw after it leaves the cylinder. As shown in the drawings, it is arranged immediately at the rear of the beater and above the shaker or conveyer 4 and has its upper end hinged to the machine, so that it may have a swinging movement.

35 denotes a lever pivoted at a point between its ends to a stud 36, projecting laterally from one of the side pieces of the feeder.

37 denotes a link connecting one arm of the lever to the swinging arm 18, and 38 denotes a similar link connecting the regulating device to the upper arm of the lever. The link 38 has an adjustable connection with the upper arm of the lever, and in the present instance this connection is effected by a bolt and slot. Any other suitable means may be employed. This adjustment furnishes means for setting the machine to feed bundles at a predetermined speed.

In operation the bundles are fed upon the bundle-conveyer 7, which moves them rearwardly under the band-cutter where the band is cut. From this point the mass of grain is carried direct to the cylinder. After having been threshed the straw is fed upon the shaker or conveyer 4 and is beaten down by the beater 5 and is then led rearwardly and continues its movement, passing under the regulating device, which has been previously adjusted by the link connection 38 with the upper end of the lever 35. Should the bundles be fed to the feeder regularly and in uniform quantities, the straw after passing from the threshing-cylinder will be conveyed under the regulating device to the rear end of the machine in the usual manner. If, however, the bundles are fed too fast into the machine, the straw after passing from the cylinder will bank to such a height as to strike the regulating device, thus swinging its lower end rearward and causing the friction-disk 21 through its intermediate mechanism to swing upwardly between the disks 26 and 27 and engage them at points nearer their peripheries, thus reducing the speed of the shaft 24, to which the disks 26 and 27 are keyed, and correspondingly reducing the movement of the endless bundle-conveyer 7, which will continue to move at a reduced rate of speed until the regulating device shall have assumed its normal position. If the feed is excessive or too great, the bundle-carrier will be entirely stopped. In assuming its normal position the regulating device moves inwardly, thus locking the lever 35 and lowering the friction-disk 21 nearer the axis of the friction-disks 26 and 27, and thus increasing the speed of the bundle-conveyer 7 to the degree to which it has been set by the adjustment of the link 38 with the lever 35. When a tightly-compressed bundle is fed to the machine and is threshed and its resultant straw is of a quantity too great to be taken proper care of by the machine after it leaves the threshing-cylinder, the regulating device will be actuated and the speed of the bundle-conveyer will be reduced or may be entirely stopped, while, on the other hand, if a loosely-tied bundle is fed past the threshing-cylinder and the resultant straw does not meet the working capacity of the machine the regulating device will lower and increase the speed of the movement of the bundle-conveyer. In machines of the character in which the movement of the feeder is regulated or controlled by devices actuated by the bundle before it has been severed and the grain threshed and the regulating devices set to receive a hard and compact bundle should a large loose bundle or mass be thrown into the feeder the regulating means would fail to distinguish the difference between the hard compact bundles and the large loose bundles, and consequently the regulating mechanism, being actuated by the bulk instead of the quantity, would immediately cut off the feed incommensurate with the capacity of the threshing-machine, or if set to feed a proper amount of loose grain the regulating means would feed an over amount of hard or compact grain, and thus chock the threshing-machine.

From the foregoing description, taken in connection with the accompanying drawings, the construction, operation, and advantages of my invention will be readily understood without requiring an extended explanation. It will be readily seen that the device is exceedingly useful for the purpose for which it is designed and may be placed upon the market at a comparatively small cost.

Various changes in the form, proportion, and the minor details of construction may be resorted to without departing from the principle or sacrificing any of the advantages of this invention. For instance, in lieu of the variable-friction gearing I may employ any form of positively and uniformly driven gearing, which, being controlled by the regulating device, will be stopped when an excessive amount of straw passes the threshing-cylinder and actuates the regulating device and be automatically started when the machine has been restored to its normal working condition.

Having thus fully described my invention, what is claimed, and desired to be secured by Letters Patent, is—

1. The combination with a threshing-machine and a self-feeder, of a regulator actuated by the straw at the rear of the threshing-cylinder to control the amount of grain being fed to the threshing-cylinder, substantially as set forth.

2. The combination with a threshing-machine and a feeder therefor, of a movable regulating device arranged within the path of movement of the threshed straw, a constantly-moving variable-speed gearing geared with the feeder for actuating the same, and a connection between the regulating device and the variable-speed gearing for shifting the variable-speed gearing to change the speed of movement of the conveyer, substantially as set forth.

3. The combination with a threshing-machine and a feeder therefor, of a hinged arm, a constantly-driven wheel journaled in said arm, suitably-journaled gear-wheels with which said constantly-driven wheel is geared, a movable regulating device arranged at the rear of the threshing-cylinder and within the path of movement of the straw, a connection between the regulating device and the hinged arm for rocking said arm, and intermediate gearing for transmitting the motion of the gear-wheels with which the constantly-driven gear-wheel is connected to the feeder, substantially as set forth.

In testimony whereof I have hereunto set my hand in presence of the subscribing witnesses.

GEORGE F. CONNER.

Witnesses:
EARL C. AKERS,
H. B. HOYT,
H. C. TRENT.